(12) United States Patent
Ellis et al.

(10) Patent No.: US 11,440,416 B2
(45) Date of Patent: Sep. 13, 2022

(54) MAGLEV SUPERVISORY CONTROL ARCHITECTURE

(71) Applicants: SAFRAN LANDING SYSTEMS, Velizy-Villacoublay (FR); SAFRAN LANDING SYSTEMS CANADA INC., Ajax (CA)

(72) Inventors: Andrew Michael Ellis, Guelph (CA); Graeme Peter Arthur Klim, Velizy-Villacoublay (FR); Thibaud Mazoue, Nogent-sur-Marne (FR)

(73) Assignees: SAFRAN LANDING SYSTEMS, Velizy-Villacoublay (FR); SAFRAN LANDING SYSTEMS CANADA INC., Ontario (CA)

( * ) Notice: Subject to any disclaimer, the term of this patent is extended or adjusted under 35 U.S.C. 154(b) by 400 days.

(21) Appl. No.: 16/804,441

(22) Filed: Feb. 28, 2020

(65) Prior Publication Data

US 2021/0268913 A1 Sep. 2, 2021

(51) Int. Cl.
*B60L 13/06* (2006.01)

(52) U.S. Cl.
CPC ........... *B60L 13/06* (2013.01); *B60L 2200/26* (2013.01)

(58) Field of Classification Search
None
See application file for complete search history.

(56) References Cited

U.S. PATENT DOCUMENTS

| | | | |
|---|---|---|---|
| 6,809,271 B1 * | 10/2004 | Horsfall | G01G 19/042 |
| | | | 177/163 |
| 7,369,922 B2 | 5/2008 | Garcia | |
| 2013/0139717 A1 * | 6/2013 | Smith | B64F 1/04 |
| | | | 104/282 |
| 2018/0312245 A1 | 1/2018 | Klim et al. | |
| 2018/0223481 A1 | 8/2018 | Dunham | |
| 2019/0366853 A1 * | 12/2019 | Qu | B60K 8/00 |

FOREIGN PATENT DOCUMENTS

| | | |
|---|---|---|
| FR | 2887516 A1 | 6/2005 |
| JP | 2003-104200 A | 4/2003 |
| JP | 2003104200 A * | 4/2003 |

OTHER PUBLICATIONS

International Search Report and Written Opinion dated May 10, 2021, issued in corresponding International Application No. PCT/IB2021/051465, filed Feb. 22, 2021, 13 pages.

* cited by examiner

*Primary Examiner* — Jared Fureman
*Assistant Examiner* — Joel Barnett
(74) *Attorney, Agent, or Firm* — Christensen O'Connor Johnson Kindness

(57) ABSTRACT

In some embodiments, a control unit for a vehicle is provided. The vehicle may be a maglev vehicle. The control unit is configured to autonomously control positions of landing gear on the vehicle that are extendible and retractable. In some embodiments, the control unit is configured to detect a change in a weight-on-wheels state of the vehicle, and to transition between passively controlling extension or retraction of the landing gear and actively controlling the extension distance of the landing gear in order to maintain a desired distance between the vehicle and a levitation mechanism.

15 Claims, 3 Drawing Sheets

MAGLEV SUPERVISORY CONTROL ARCHITECTURE

BACKGROUND

A maglev transportation system includes an evacuated (low-pressure) tube and a pressurized capsule containing passengers and/or cargo. The capsule is a vehicle that may use wheel systems for support, propulsion, and braking at low speeds, and may use magnets, compressed air, or other techniques to levitate at high speeds (typically higher than 100 kph).

Maglev systems provide the potential for highly efficient transport. To increase the efficiency of such systems, reconfigurable vehicles (e.g., vehicles that can extend and retract their wheels) are desirable in order to provide a maximally efficient design for the vehicles during different portions of a trip cycle. One example of an extendable and retractable wheel system (or landing gear) is described in U.S. Pre-Grant Publication No. 2018/0312245, assigned to Safran Landing Systems Canada Inc., the entire disclosure of which is hereby incorporated by reference for all purposes.

Providing autonomous operating capability for such deployable vehicle struts or landing gear is desirable, at least because vehicles can be more compact and operated more efficiently if reliance on a human operator is not required.

BRIEF SUMMARY

A control unit for a vehicle is provided in accordance with an aspect of the present disclosure. In an embodiment, the control unit is configured with logic that, in response to execution by the control unit, cause the control unit to perform actions comprising: receiving a command to extend at least one landing gear of the vehicle from a stowed position or to retract the at least one landing gear of the vehicle from an extended position; causing at least one motor control unit of the vehicle to extend or retract the at least one landing gear based on the command; detecting a change in a weight-on-wheels state of the vehicle; and transitioning between passively controlling an extension distance of the at least one landing gear and actively controlling the extension distance of the at least one landing gear based on the change in the weight-on-wheels state.

In any embodiment, actively controlling the extension distance of the at least one landing gear may include receiving a sensed distance value from a sensor of the vehicle, wherein the sensed distance value represents a distance between a component of the vehicle and a levitation mechanism; determining a desired distance value, wherein the desired distance value represents a desired distance between the component of the vehicle and the levitation mechanism; and using the sensed distance value and the desired distance value to determine a control input to the at least one motor control unit. In some embodiments, determining the desired distance value may include receiving a vehicle speed value from a vehicle speed sensor, and determining the desired distance value based on the vehicle speed value. In some embodiments, using the sensed distance value and the desired distance value to determine a control input to the at least one motor control unit may include providing the sensed distance value and the desired distance value to a proportional-integral (PI) control logic, a proportional-derivative (PD) control logic, or a proportional-integral-derivative (PID) control logic.

In any embodiment, detecting the change in the weight-on-wheels state of the vehicle may include receiving a landing gear state value from a landing gear sensor; and determining the weight-on-wheels state of the vehicle based on the landing gear state value. In some embodiments, receiving the landing gear state value from the landing gear sensor may include at least one of receiving a ground contact detection value and receiving a static stroke detection value. In some embodiments, receiving the landing gear state value from the landing gear sensor may include receiving a shock absorber compression value, and determining the weight-on-wheels state of the vehicle based on the landing gear state value may include comparing the shock absorber compression value to a threshold compression value.

In any embodiment, passively controlling the extension distance of the at least one landing gear may include determining a control input to move the at least one landing gear from a current extension distance to a fully extended position or a stowed position; and providing the control input to the at least one motor control unit. In some embodiments, determining the control input to move the at least one landing gear from the current extension distance to the fully extended position or the stowed position may include determining the control input based on a rate specified by the command to extend the at least one landing gear or to retract the at least one landing gear.

A maglev vehicle is also provided in accordance with an aspect of the present disclosure. In an embodiment, the maglev vehicle comprises at least one landing gear, at least one motor control unit configured to change an extension distance of the at least one landing gear; and a control unit configured with logic that, in response to execution by the control unit, cause the control unit to perform actions comprising: receiving a command to extend at least one landing gear of the vehicle from a stowed position or to retract the at least one landing gear of the vehicle from an extended position; causing at least one motor control unit of the vehicle to extend or retract the at least one landing gear based on the command; detecting a change in a weight-on-wheels state of the vehicle; and transitioning between passively controlling an extension distance of the at least one landing gear and actively controlling the extension distance of the at least one landing gear based on the change in the weight-on-wheels state.

In any embodiment, the maglev vehicle may further comprise at least one landing gear sensor communicatively coupled to the control unit.

In any embodiment, the maglev vehicle may further comprise at least one sensor configured to determine a sensed distance value that represents a distance between a component of the maglev vehicle and a levitation mechanism, wherein the at least one sensor is communicatively coupled to the control unit.

In any embodiment, the maglev vehicle may further comprise at least one vehicle speed sensor communicatively coupled to the control unit.

In any embodiment, the control unit of the maglev vehicle may be a first control unit, and the maglev vehicle may further comprise a second control unit configured to transmit commands to the first control unit.

A non-transitory computer-readable medium is further provided according to an aspect of the present disclosure. In an embodiment, the computer-readable medium has computer-executable instructions stored thereon that, in response to execution by a control unit of a vehicle, cause the control unit to perform actions comprising: receiving a command to extend at least one landing gear of the vehicle from a stowed position or to retract the at least one landing gear of the vehicle from an extended position; causing at least one motor control unit of the vehicle to extend or retract the at least one landing gear based on the command; detecting a change in a weight-on-wheels state of the vehicle; and transitioning between passively controlling an extension distance of the at least one landing gear and actively controlling the extension distance of the at least one landing gear based on the change in the weight-on-wheels state.

DESCRIPTION OF THE DRAWINGS

Non-limiting and non-exhaustive embodiments of the disclosed subject matter are described with reference to the following figures, wherein like reference numerals refer to like parts throughout the various views unless otherwise specified. Not all instances of an element are necessarily labeled so as not to clutter the drawings where appropriate. The drawings are not necessarily to scale, emphasis instead being placed upon illustrating the principles being described. To easily identify the discussion of any particular element or act, the most significant digit or digits in a reference number refer to the figure number in which that element is first introduced.

DETAILED DESCRIPTION

A vehicle with retractable landing gear is provided. In order to provide autonomous control of the vehicle throughout a trip cycle during which the vehicle may be in a weight-on-wheels state or a weight-off-wheels state at unpredictable times and in unpredictable landing gear positions, a control unit, such as a control circuit, is provided that autonomously manages the extension, retraction, and active control of the retractable landing gear in order to safely and efficiently control the position of the landing gear throughout the trip cycle.

Figure 1:
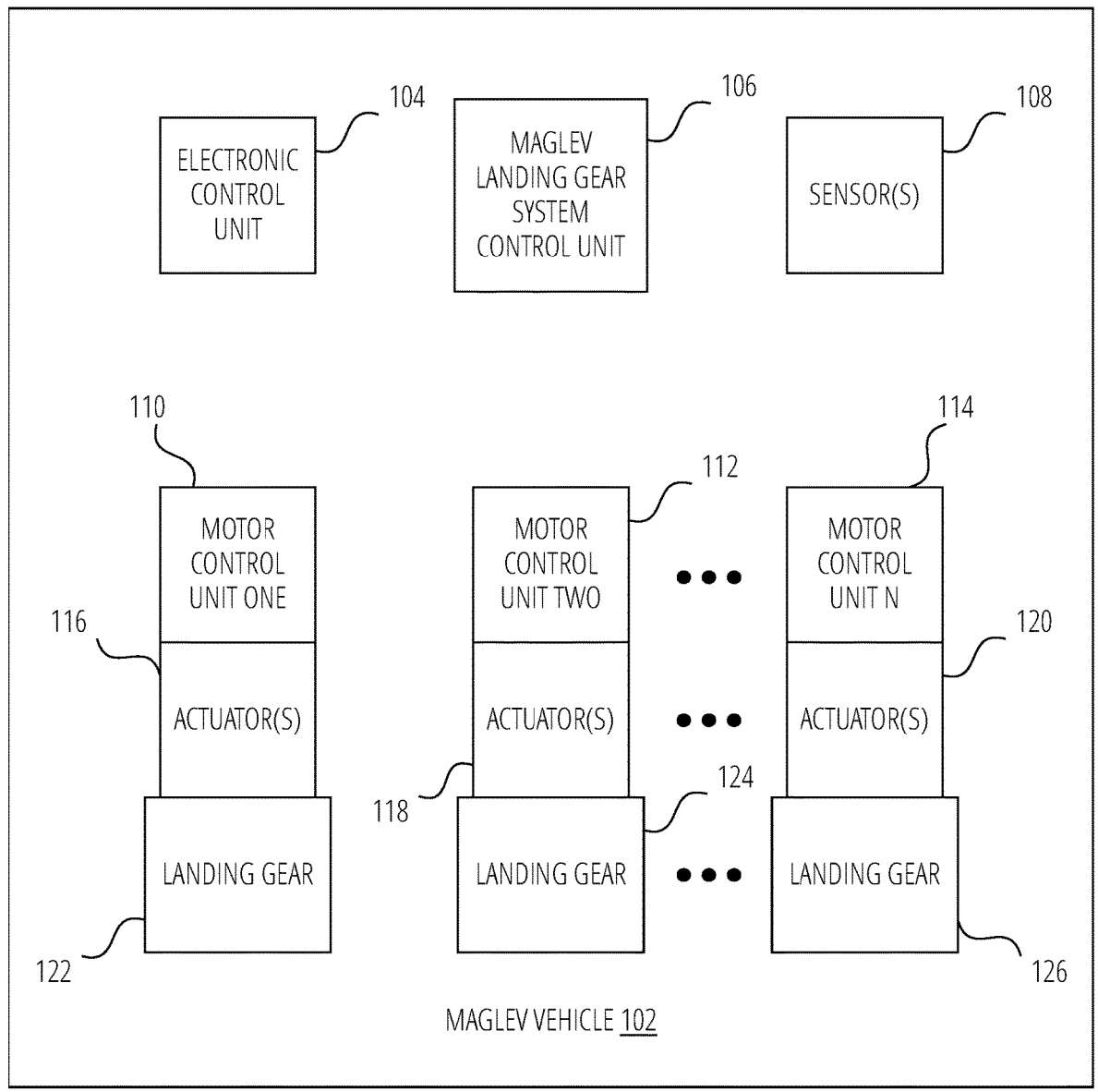
FIG. 1 is a block diagram that illustrates a non-limiting example embodiment of a maglev vehicle according to various aspects of the present disclosure.

FIG. 1 is a block diagram that illustrates a non-limiting example embodiment of a maglev vehicle, generally designated 102, according to various aspects of the present disclosure. As described above, the maglev vehicle 102 may include a pressurized capsule configured to contain passengers and/or cargo. In some embodiments, the maglev vehicle 102 may be a flat bed or other type of platform that lacks a pressurized capsule but is configured to carry cargo within the maglev system. The maglev vehicle 102 uses retractable wheel systems at low speeds and a levitation system at high speeds. Though a maglev vehicle 102 is primarily described herein, one will recognize that embodiments of the present disclosure may be used with other vehicles that use retractable wheel systems at low speeds and levitation systems at high speeds, including but not limited to maglev trains.

As illustrated, the maglev vehicle 102 has N landing gear, including landing gear 122, landing gear 124, and landing gear 126. In some embodiments, the maglev vehicle 102 includes eight independently actuated landing gear (sometimes referred to as "wheel systems") grouped on two independent bogies, similar to a train car. Each bogie may include, for example, two wheel systems equipped with electric or hydraulic brakes and two wheel systems equipped with an electric wheel drive. In some embodiments, more or fewer wheel systems may be included in the maglev vehicle 102. In some embodiments, the wheel systems may be provided in different configurations (including but not limited to all wheel systems on a bogie or vehicle including electric wheel drives, all wheel systems on a bogie or vehicle including brakes, some wheel systems providing load bearing only without drives or brakes).

Each of the independently actuated wheel systems may be equipped with an extension/retraction actuator system capable of additionally managing a height of the maglev vehicle 102 above a ground interface or track. As illustrated, landing gear 122 is associated with one or more actuator(s) 116, landing gear 124 is associated with one or more actuator(s) 118, and landing gear 126 is associated with one or more actuator(s) 120. Each actuator may be referred to as a wheel position control actuator, and may use hydraulic, pneumatic, or electric technologies (or combinations thereof) to change the positions of the landing gear. In some embodiments, each landing gear may include an oleo pneumatic shock absorber that is compressible (linear or otherwise) in order to support the retraction function. In some embodiments, a liquid spring, coil spring, leaf spring, rubber spring, or electromechanical strut may be used to perform the shock absorption function. Various non-limiting examples of extendible and retractable landing gear mechanisms suitable for use with the maglev vehicle 102 are disclosed in commonly owned and co-pending U.S. Pre-Grant Publication No. 2018/0312245, the entire disclosure of which is hereby incorporated by reference in its entirety for all purposes.

As illustrated, the maglev vehicle 102 includes a central electronic control unit (ECU 104) which is responsible for overall control of the operation of the maglev vehicle 102. The ECU 104 is communicatively coupled to a maglev landing gear system control unit (MLGCU 106), which is responsible for coordinating the state of all of the landing gear. To that end, the MLGCU 106 is communicatively coupled to one or more motor control units (MCUs), including the illustrated MCU one 110, MCU two 112, and MCU N 114, and may transmit control inputs to the MCUs. Each MCU controls one or more electromechanical actuators (EMAs), such as actuator(s) 116, actuator(s) 118, and actuator(s) 120, which drive extension, retraction, and active vehicle height control for the corresponding landing gear. In some embodiments, hydraulic, pneumatic, or other types of actuators may be used instead of EMAs.

As illustrated, the maglev vehicle 102 also includes one or more sensor(s) 108. These sensor(s) 108 may include landing gear state sensors capable of generating values that represent states including, but not limited to, whether the landing gear is in contact with the ground, whether the landing gear has reached static stroke, and an amount of compression of a shock absorber of the landing gear. These sensor(s) 108 may also include vehicle state sensors capable of generating values that represent states including, but not limited to, a vehicle speed and a distance between a component of the maglev vehicle 102 and a levitation mechanism. Any suitable types of devices may be used to create these sensor(s) 108, including but not limited to shaft encoders, photosensors, sonic rangefinders, and laser measurement devices. In some embodiments, the sensor(s) 108 are communicatively coupled to the ECU 104 and/or the MLGCU 106, and values generated by the sensor(s) 108 may be transmitted to the ECU 104 and/or the MLGCU 106.

In some embodiments, additional copies of ECU 104, MLGCU 106, and/or other components may be provided for redundancy. Further, the components of maglev vehicle 102 may be communicatively coupled via any suitable communication technique, including but not limited to serial wired communication, wireless communication (via Bluetooth, Wi-Fi, or other wireless communication techniques), and/or networked wired communication (via USB, Ethernet, CAN-BUS, or other wired communication techniques). Also, the separation of functionality between the ECU 104 and MLGCU 106 is an example only, and in some embodiments, functionality of the ECU 104 and MLGCU 106 may be combined in a single device.

One of skill in the art will recognize that embodiments of the maglev vehicle 102 may also include other components, including but not limited to magnets and/or other components of a levitation system, and a passenger/cargo cabin. Such components have not been illustrated in FIG. 1 to avoid obscuring other important aspects of the present disclosure. Further, one of skill in the art will recognize that, although FIG. 1 illustrates three landing gear (and associated components), this number of landing gear is an example only, and in some embodiments, more or fewer landing gear may be present on the maglev vehicle 102.

Figure 2:
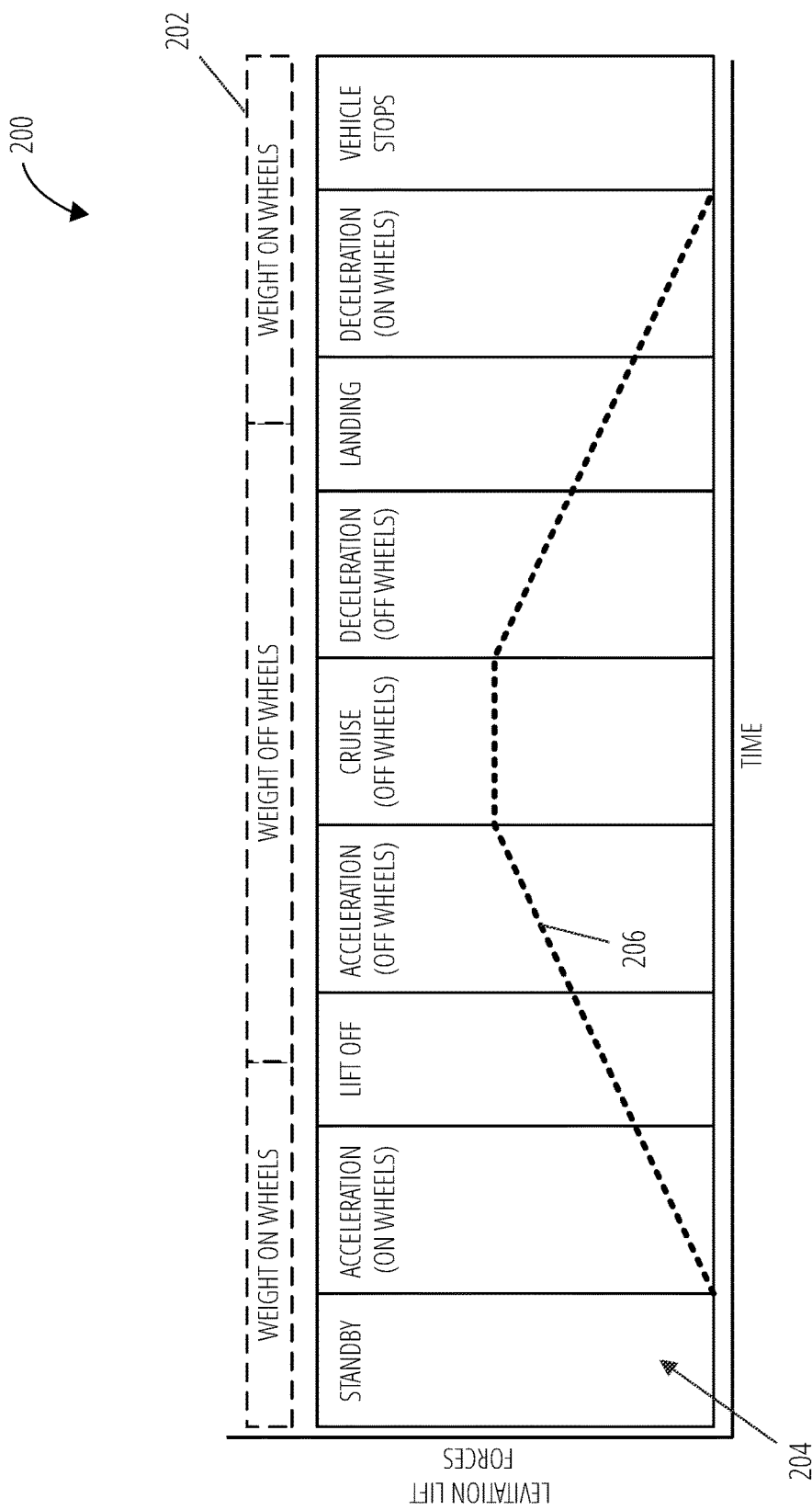
FIG. 2 is a chart that illustrates an example embodiment of a vehicle trip cycle according to various aspects of the present disclosure.

FIG. 2 is a chart that illustrates an example embodiment of a vehicle trip cycle according to various aspects of the present disclosure. In the chart 200, time is represented in a horizontal axis, with a beginning of a trip cycle being at the left side of the chart 200, and the trip cycle extending over time to the right of the chart 200. A vertical axis of the chart 200 illustrates levitation lift forces being applied to the maglev vehicle 102 by a system other than the landing gear, such as a magnetic levitation system. The amount of levitation lift force being applied at any given time during the trip cycle is illustrated by a dashed line 206. A set of trip cycle stages 204 is illustrated that include, for example, standby, acceleration (on wheels), lift off, acceleration (off wheels), cruise (off wheels), deceleration (off wheels), landing, deceleration (off wheels), and vehicle stops.

A set of wheel weight states 202 is also illustrated to show when, during the vehicle trip cycle, any weight of the maglev vehicle 102 is being borne by the landing gear. In some embodiments, the wheel weight states (e.g., Weight on Wheels or Weight off Wheels) may be determined based on the breakout of a shock absorber, such that the Weight on Wheels state will be considered true when the compression of the shock absorber is compared to a threshold compression, and the threshold compression of the shock absorber is passed (and will otherwise be considered false). In some embodiments, other conditions may be considered to determine the Weight on Wheels state. For example, in some embodiments, any time the tires or other ground engaging member of the landing gear are in contact with the ground (also known as "touchdown") may be considered to be a Weight on Wheels state. As another example, in some embodiments, the Weight on Wheels state may be considered to be true once static stroke has been reached.

The vehicle trip cycle starts in a first stage, referred herein as standby, in which the maglev vehicle 102 is at rest and all weight of the maglev vehicle 102 is borne by the landing gear. The trip cycle then transitions to an acceleration (on wheels) stage. During this state of the maglev vehicle 102, the landing gear equipped with motors may provide wheel torque up until a point when spin-out occurs. In some embodiments, these drive wheels may draw power directly from a power source of the maglev vehicle 102. In some embodiments, the drive wheels may obtain power from a track or overhead wire (as with metro, train, and tram architectures). In some embodiments, the MLGCU 106 may provide active control of the height of the maglev vehicle 102 during this stage.

During this acceleration (on wheels) stage, magnets positioned on an underbelly or undercarriage of the maglev vehicle 102 (or in another suitable location, such as on a lower portion of the maglev vehicle 102 at a 45 degree angle to a vertical axis) begin to provide lift to the vehicle. Until a certain levitation speed is reached, producing lift, the magnets may impart a drag force on the vehicle, analogous to dense air at sea-level at take-off. This drag force may be governed by at least two parameters: a distance between the energized surface (such as aluminum) and the speed at which the magnets travel over the energized surface.

As the speed of the maglev vehicle 102 increases and the lift force provided by the levitation system increases, the maglev vehicle 102 transitions from the acceleration (on wheels) stage to the lift off stage. At this stage, the landing gear are no longer bearing the weight of the maglev vehicle 102, speed continues to increase, and lift force continues to increase, as the trip cycle transitions to an acceleration (off wheels) stage. Typically, during the acceleration (off wheels) stage, the landing gear of the maglev vehicle 102 may be retracted in order to further improve the performance of the maglev vehicle 102 (e.g., by improving an aerodynamic profile of the maglev vehicle 102).

Eventually, the maglev vehicle 102 has accelerated to a maximum desired speed, and the trip cycle transitions to a cruise (off wheels) stage. At this stage, the speed of the maglev vehicle 102 and the lift force applied to the maglev vehicle 102 may remain relatively constant.

After the cruise (off wheels) stage, the trip cycle transitions to a deceleration (off wheels) stage, where the maglev vehicle 102 will begin to lose speed. The deceleration may be performed by removing a propulsive force from the maglev vehicle 102 applied by a linear induction system or a linear synchronous motor, by running a linear induction system or a linear synchronous motor in reverse, by exerting a drag force using the levitation system, or by any other suitable method. During this stage, if the landing gear had previously been retracted, the landing gear would be extended to prepare to support the weight of the maglev vehicle 102 as the speed and levitation force drop. The trip cycle then transitions to a landing stage, at which point the landing gear once again bear at least some of the weight of the maglev vehicle 102.

After the landing stage, the trip cycle transitions to a deceleration (on wheels) stage. During this stage, brakes of the landing gear may be used to apply further deceleration force to the maglev vehicle 102. In some embodiments, the MLGCU 106 may provide active height control of the maglev vehicle 102 during this stage. Eventually, the maglev vehicle 102 comes to a stop, and the trip cycle transitions to a vehicle stop stage.

In order to minimize the drag force on the maglev vehicle 102, it is desirable to maintain an appropriate distance between the magnets of the maglev vehicle 102 and the track or other support surface or levitation system. Because the lift force changes based on the speed of the maglev vehicle 102, and because the track or other support surface may not be perfectly flat, it is desirable that active control of the extension of the landing gear be provided in order to maintain the appropriate distance between the maglev vehicle 102 and the support surface or levitation system. Due to this active control, the transition between the weighton-wheels state and the weight-off-wheels state is likely to occur in an unpredictable landing gear position between full extension and full retraction.

In order to safely control the extension, retraction, and active height control functionality of the maglev vehicle 102 throughout the trip cycle, the MLGCU 106 provides supervisory control for the system. The MLGCU 106 manages extension, retraction, and active height control through each of the trip stages, including when the maglev vehicle 102 is at rest during the standby and vehicle stopped stages, and when the maglev vehicle 102 is in motion during the acceleration (on wheels), acceleration (off wheels), cruise, deceleration (off wheels), and deceleration (on wheels) stages. Functions performed by the MLGCU 106 include extension, retraction, and active height control of the maglev vehicle 102, as well as system health monitoring, indication, data logging, communications management, trajectory generation, emergency functions, and/or other functions.

In some embodiments, in order to provide each of these functions according to the trip stage, the MLGCU 106 includes logic that implements a finite state machine to manage the state and mode. In some embodiments, the logic may include computer-executable instructions stored on a non-transitory computer-readable medium that, in response to execution by at least one processor of the MLGCU 106, cause the MLGCU 106 to implement the finite state machine. Any suitable computer-readable medium, including but not limited to a magnetic hard disk drive, flash memory, optical memory, or a ROM, may be used. In some embodiments, the logic may include circuitry of an application-specific integrated circuit (ASIC) or a field-programmable gate array (FPGA) configured to implement the finite state machine.

In some embodiments, the MLGCU 106 is configured to perform the actions set forth in claims 1-9. In some embodiments, a maglev vehicle 102 includes a control unit, such as the MLGCU 106, as set forth in claims 10-14. In some embodiments, a computer-readable medium stores instructions thereon that, in response to execution by a control unit of a vehicle, such as the MLGCU 106, cause the control unit to perform the actions set forth in claim 15.

Figure 3:
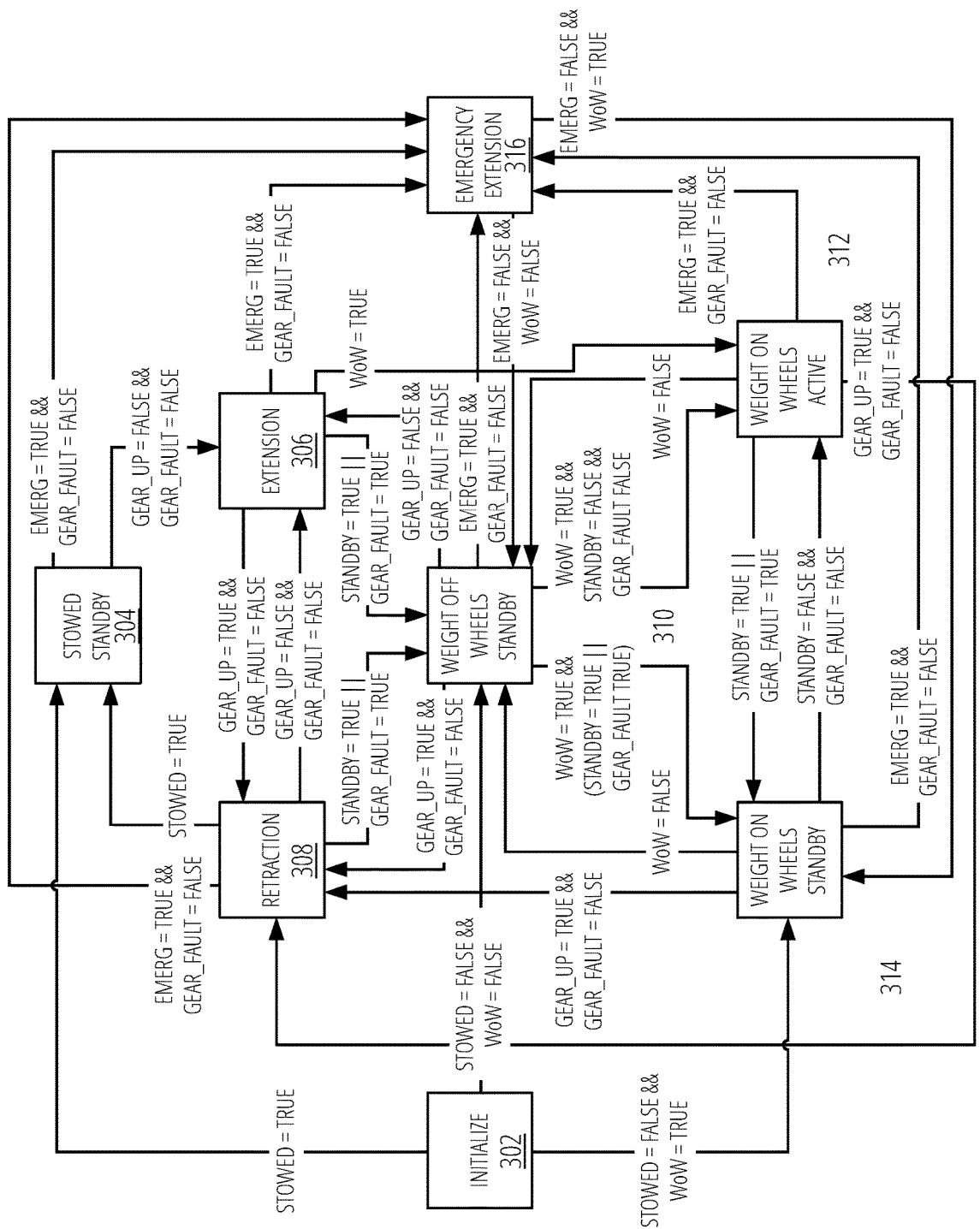
FIG. 3 is a state diagram that illustrates a non-limiting example embodiment of a finite state machine implemented by an MLGCU according to various aspects of the present disclosure.

FIG. 3 is a state diagram that illustrates a non-limiting example embodiment of a finite state machine implemented by an MLGCU 106 according to various aspects of the present disclosure. The states within the finite state machine are an initialize state 302, a stowed standby state 304, an extension state 306, a retraction state 308, a weight off wheels standby state 310, a weight on wheels active state 312, a weight on wheels standby state 314, and an emergency extension state 316. In some embodiments, if active control is not required, the weight on wheels active state 312 may not be included.

In some embodiments, the initialize state 302 indicates that power-up of the system is in progress. In the initialize state 302, the MLGCU 106 may be allowed to perform built-in tests, and may hold while various elements of the system power up completely. Once the MLGCU 106 receives notifications that all of the elements of the system have powered up completely, the MLGCU 106 may transmit an indication to the ECU 104 that the system is ready to leave the initialize state 302.

In some embodiments, the stowed standby state 304 indicates that the landing gear are all fully stowed. In the stowed standby state 304, the MLGCU 106 may be allowed to perform built-in tests, hold the actuator(s) in place, enter a power-saving mode (or shut off completely), and/or close bay doors (if any are present in the system and if they are not already closed during the retraction process.

In some embodiments, the extension state 306 indicates that extension of the landing gear is about to begin or is in progress. In the extension state 306, the MLGCU 106 may wake from a power-saving mode if it had been dormant, may perform built-in tests, and may cause the actuator(s) to extend the landing gear from a current position. The MLGCU 106 may cause the actuator(s) to extend the landing gear in any suitable pattern, such as individually, in groups, or all at once, and at any suitable rate, including fixed or variable rates. The control of the MLGCU 106 during the extension state 306 may be considered passive, at least because the MLGCU 106 may control the actuator(s) based on fixed or variable rates without regard to a height of the maglev vehicle 102. During the extension state 306, the MLGCU 106 may monitor readings from various sensors to detect Weight on Wheels or touchdown, and may monitor for system faults including but not limited to jamming, power loss, and over-extension.

In some embodiments, the retraction state 308 indicates that retraction of the landing gear is about to begin or is in progress. In the retraction state 308, the MLGCU 106 may wake from a power-saving mode if it had been dormant, may perform built-in tests, and may cause the actuator(s) to retract the landing gear from a current position. As with extension of the landing gear, the MLGCU 106 may cause the actuators to retract the landing gear in any suitable pattern and at any suitable rate, and may be considered passive because the control may be provided without regard to a height of the maglev vehicle 102. During the retraction state 308, the MLGCU 106 may monitor readings from various sensors to detect landing gear positions and stowage, and may monitor for system faults including but not limited to jamming, power loss, and over-retraction.

In some embodiments, the weight off wheels standby state 310 indicates that the vehicle is off the ground and no motion of the actuators is desired. In the weight off wheels standby state 310, the MLGCU 106 may perform built-in tests, may monitor for Weight on Wheels, and may monitor for system faults including but not limited to power loss and loss of communication.

In some embodiments, the weight on wheels active state 312 indicates that active control of the height of the maglev vehicle 102 (e.g., control of a distance between magnets of the maglev vehicle 102 and the track) may begin or is in process. In the weight on wheels active state 312, the MLGCU 106 may wake from a power-saving mode, may perform built in tests, may monitor for the loss of Weight on Wheels, and may monitor for system faults including but not limited to jamming, power loss, and loss of stability. In some embodiments, the MLGCU 106 may instruct the MCUs to use the actuator(s) to move the landing gear at individual, grouped, or communal fixed or variable rates in order to actively control the height of the maglev vehicle 102 with respect to a distance between magnets of the maglev vehicle 102 and the track. The MLGCU 106 may use any suitable control technique, including but not limited to a feedback control system such as a proportional-derivative (PD) controller, a proportional-integral (PI) controller, or a proportional-integral-derivative (PID) controller implemented in logic of the MLGCU 106 or elsewhere, that uses a desired distance value as a setpoint, a sensed distance value determined by a sensor device as a process variable, and an instruction to the MCUs as a control output.

In some embodiments, the weight on wheels standby state 314 indicates that the maglev vehicle 102 is on the ground, but no active height control is to be performed. In the weight on wheels standby state 314, the MLGCU 106 may perform built-in tests, may monitor for loss of Weight on Wheels, and may monitor for system faults including but not limited to power loss and loss of communication.

In some embodiments, the emergency extension state 316 indicates that emergency extension may begin or is in progress. The emergency extension state 316 may allow extension of the landing gear independent of real-time vehicle-level feedback. For example, the position of the landing gear may be determined solely by using linear potentiometers, rotary encoders, or other sensors that detect the position of the actuator(s) and/or the landing gear themselves, instead of by using a height sensor configured to determine a distance between magnets of the maglev vehicle 102 and the track. Upon emergency extension, the final position of the landing gear is at full extension of the actuator(s). While in the emergency extension state 316, the MLGCU 106 may wake from a power saving mode if it had been dormant, extend the gears at individual, grouped, or communal fixed or variable rates to achieve full actuator extension, monitor for Weight on Wheels or touchdown, and/or monitor for system faults including but not limited to jamming, power loss, and over-extension.

In some embodiments, transitions between the illustrated states may be governed by five indicators. A GEAR_UP indicator indicates that the ECU 104 has requested the landing gear to be in their stowed position. A STANDBY indicator indicates that the ECU 104 has requested the landing gear to disable active control, while leaving extension and retraction available. A STOWED indicator indicates that all landing gear are in their fully stowed positions. A GEAR_FAULT indicator indicates that a fault has occurred preventing motion of at least one landing gear. A WoW indicator indicates that a global Weight on Wheels (WoW) signal is TRUE. An EMERG indicator indicates that the landing gear should perform an emergency extension. In some embodiments, the MLGCU 106 may include logic to avoid rapidly cycling between states (such as if the landing gear are in brief, intermittent contact with the track or other support surface), including but not limited to a time delay between first detecting an indicator and performing a state transition.

In some embodiments, the indicators may be fulfilled by generation of a Boolean signal to drive the state transitions. In some embodiments, indicators may be generated by commands, by messages, or by monitoring analog values.

In some embodiments, an example of a command being used to generate an indicator could be provided by the GEAR_UP indication. The GEAR_UP indication may be generated upon receipt of a command from the ECU 104 to either extend or retract the landing gear. The retraction command could cause the GEAR_UP indication to have a value of Boolean TRUE, and the extension command could cause the GEAR_UP indication to have a value of Boolean FALSE. In some embodiments, using a command from the ECU 104 instead of directly passing the Boolean value desired can provide benefits, including but not limited to providing the ability to provide additional parameters along with the command, including but not limited to an extension/retraction duration, an extension/retraction speed, a target vehicle height from the ground, or other reasonably envisioned quantities that may be passed along with the command.

In some embodiments, an example of a message being used to generate an indicator could be provided by the GEAR_FAULT indication. The ECU 104 or MLGCU 106 may monitor messages from sensors or other components of the maglev vehicle 102 on a communication bus, and may cause the GEAR_FAULT indication to be generated (or to take on a Boolean value of TRUE) upon detecting a message that indicates a relevant fault. One advantage of using messages to generate indicators is that a message may contain a code (such as an error code) containing further information about the event driving the state transition. This code can allow the ECU 104 or MLGCU 106 to further determine whether the fault is severe enough to cause the GEAR_FAULT indication to be generated.

In some embodiments, an example of an analog value being used to generate an indicator could be provided by the Weight on Wheels (WoW) indication. The ECU 104 or MLGCU 106 may monitor a signal from a load sensor that generates an analog value that represents a load borne by the landing gear. The ECU 104 or MLGCU 106 may cause the WoW indication to be generated (or to take on a Boolean value of TRUE) upon detecting that the load borne by the landing gear has passed a threshold value.

Another example of an analog value being used to generate an indicator could be provided by the STOWED indication. The ECU 104 or MLGCU 106 may monitor a signal from a sensor that reports a position of the actuator(s) or of the landing gear themselves, and may cause the STOWED indication to be generated (or to take on a Boolean value of TRUE) upon detecting that the position has passed a threshold position.

In the preceding description, numerous specific details are set forth to provide a thorough understanding of various embodiments of the present disclosure. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

The above description of illustrated embodiments of the disclosed subject matter, including what is described in the Abstract, is not intended to be exhaustive or to limit the claimed subject matter to the precise forms disclosed. While specific embodiments of, and examples for, the claimed subject matter are described herein for illustrative purposes, various modifications are possible within the scope of the claimed subject matter, as those skilled in the relevant art will recognize.

These modifications can be made to the claimed subject matter in light of the above detailed description. The terms used in the following claims should not be construed to limit the claimed subject matter to the specific embodiments disclosed in the specification. Rather, the scope of the claimed subject matter is to be determined entirely by the following claims, which are to be construed in accordance with established doctrines of claim interpretation.

What is claimed is:

1. A control unit for a vehicle, the control unit configured with logic that, in response to execution by the control unit, cause the control unit to perform actions comprising:

receiving a command to extend at least one landing gear of the vehicle from a stowed position or to retract the at least one landing gear of the vehicle from an extended position;

causing at least one motor control unit of the vehicle to extend or retract the at least one landing gear based on the command;

detecting a change in a weight-on-wheels state of the vehicle; and transitioning between passively controlling an extension distance of the at least one landing gear and actively controlling the extension distance of the at least one landing gear based on the change in the weight-on-wheels state.

2. The control unit of claim 1, wherein actively controlling the extension distance of the at least one landing gear includes:
   receiving a sensed distance value from a sensor of the vehicle, wherein the sensed distance value represents a distance between a component of the vehicle and a levitation mechanism;
   determining a desired distance value, wherein the desired distance value represents a desired distance between the component of the vehicle and the levitation mechanism; and
   using the sensed distance value and the desired distance value to determine a control input to the at least one motor control unit.

3. The control unit of claim 2, wherein determining the desired distance value includes:
   receiving a vehicle speed value from a vehicle speed sensor; and
   determining the desired distance value based on the vehicle speed value.

4. The control unit of claim 2, wherein using the sensed distance value and the desired distance value to determine a control input to the at least one motor control unit includes providing the sensed distance value and the desired distance value to a proportional-integral (PI) control logic, a proportional-derivative (PD) control logic, or a proportional-integral-derivative (PID) control logic.

5. The control unit of claim 1, wherein detecting the change in the weight-on-wheels state of the vehicle includes:
   receiving a landing gear state value from a landing gear sensor; and
   determining the weight-on-wheels state of the vehicle based on the landing gear state value.

6. The control unit of claim 5, wherein receiving the landing gear state value from the landing gear sensor includes at least one of:
   receiving a ground contact detection value; and
   receiving a static stroke detection value.

7. The control unit of claim 5, wherein receiving the landing gear state value from the landing gear sensor includes receiving a shock absorber compression value, and wherein determining the weight-on-wheels state of the vehicle based on the landing gear state value includes comparing the shock absorber compression value to a threshold compression value.

8. The control unit of claim 1, wherein passively controlling the extension distance of the at least one landing gear includes:
   determining a control input to move the at least one landing gear from a current extension distance to a fully extended position or a stowed position; and
   providing the control input to the at least one motor control unit.

9. The control unit of claim 8, wherein determining the control input to move the at least one landing gear from the current extension distance to the fully extended position or the stowed position includes determining the control input based on a rate specified by the command to extend the at least one landing gear or to retract the at least one landing gear.

10. A maglev vehicle, comprising:
    at least one landing gear;
    at least one motor control unit configured to change an extension distance of the at least one landing gear; and
    the control unit as recited in claim 1.

11. The maglev vehicle of claim 10, further comprising at least one landing gear sensor communicatively coupled to the control unit.

12. The maglev vehicle of claim 10, further comprising at least one sensor configured to determine a sensed distance value that represents a distance between a component of the maglev vehicle and a levitation mechanism, wherein the at least one sensor is communicatively coupled to the control unit.

13. The maglev vehicle of claim 10, further comprising at least one vehicle speed sensor communicatively coupled to the control unit.

14. The maglev vehicle of claim 10, wherein the control unit is a first control unit, and wherein the maglev vehicle further comprises a second control unit configured to transmit commands to the first control unit.

15. A non-transitory computer-readable medium having computer-executable instructions stored thereon that, in response to execution by a control unit of a vehicle, cause the control unit to perform actions comprising:
    receiving a command to extend at least one landing gear of the vehicle from a stowed position or to retract the at least one landing gear of the vehicle from an extended position;
    causing at least one motor control unit of the vehicle to extend or retract the at least one landing gear based on the command;
    detecting a change in a weight-on-wheels state of the vehicle; and
    transitioning between passively controlling an extension distance of the at least one landing gear and actively controlling the extension distance of the at least one landing gear based on the change in the weight-on-wheels state.

* * * * *